US008892581B2

(12) United States Patent
Loureiro

(10) Patent No.: US 8,892,581 B2
(45) Date of Patent: Nov. 18, 2014

(54) SYSTEMS AND METHODS FOR MANAGING DATA IN A DATABASE

(76) Inventor: Jorge Diniz Queiroga Loureiro, Johannesburg (ZA)

(*) Notice: Subject to any disclaimer, the term of this patent is extended or adjusted under 35 U.S.C. 154(b) by 932 days.

(21) Appl. No.: 10/531,652

(22) PCT Filed: Oct. 17, 2002

(86) PCT No.: PCT/IB02/04273
§ 371 (c)(1),
(2), (4) Date: Mar. 7, 2006

(87) PCT Pub. No.: WO03/034173
PCT Pub. Date: Apr. 24, 2003

(65) Prior Publication Data
US 2006/0149749 A1    Jul. 6, 2006

(51) Int. Cl.
*G06F 17/30* (2006.01)
(52) U.S. Cl.
CPC .... *G06F 17/30882* (2013.01); *G06F 17/30958* (2013.01)
USPC .......................................... 707/758; 707/802
(58) Field of Classification Search
USPC ................................................. 707/758, 802
See application file for complete search history.

(56) References Cited

U.S. PATENT DOCUMENTS

| | | | |
|---|---|---|---|
| 5,708,806 A | 1/1998 | DeRose et al. | |
| 5,721,910 A | 2/1998 | Unger et al. | |
| 5,761,436 A * | 6/1998 | Nielsen | 709/245 |
| 5,815,830 A * | 9/1998 | Anthony | 707/6 |
| 5,832,472 A | 11/1998 | Sheppard, II | |
| 5,991,751 A | 11/1999 | Rivette et al. | |
| 6,154,213 A * | 11/2000 | Rennison et al. | 715/854 |
| 6,154,750 A | 11/2000 | Roberge et al. | |
| 6,178,430 B1 * | 1/2001 | Cohen et al. | 715/273 |
| 6,243,071 B1 | 6/2001 | Shwarts et al. | |
| 6,442,574 B1 | 8/2002 | Schumacher et al. | |
| 6,539,387 B1 * | 3/2003 | Oren et al. | 707/100 |
| 6,569,205 B1 * | 5/2003 | Poggi | 715/202 |
| 6,633,316 B1 | 10/2003 | Maddalozzo, Jr. et al. | |
| 6,714,215 B1 * | 3/2004 | Flora et al. | 715/716 |
| 6,848,075 B1 * | 1/2005 | Becker et al. | 715/205 |
| 7,181,438 B1 * | 2/2007 | Szabo | 707/2 |
| 2001/0034814 A1 * | 10/2001 | Rosenzweig | 711/118 |
| 2001/0047358 A1 * | 11/2001 | Flinn et al. | 707/100 |
| 2002/0032672 A1 | 3/2002 | Keith, Jr. | |
| 2002/0049882 A1 * | 4/2002 | Maslov | |
| 2002/0059459 A1 * | 5/2002 | Koka et al. | 709/246 |
| 2002/0198885 A1 | 12/2002 | Streepy, Jr. | |

FOREIGN PATENT DOCUMENTS

EP    1209577 A1    5/2002
WO    WO 01/77883   10/2001

* cited by examiner

*Primary Examiner* — Son T Hoang
(74) *Attorney, Agent, or Firm* — Kilpatrick Townsend & Stockton LLP; Dean W. Russell, Esq.; Jason D. Gardner, Esq.

(57) ABSTRACT

A database containing information relating to a particular topic includes a number of portions (10) which are each sub-divided into a number of sub-portions (12). The sub-portions (12) of each portion (10) are linked to one another in a sequential arrangement wherein each subsequent sub-portion contains further information on the topic. Selected sub-portions (12) include primary key expressions which are embedded in the information contained in the sub-portions and which are linked via a hypertext link, to other sub-portions of the database containing more information on the topic. The invention extends to a computer program product for managing the content of the database and to a method of compiling the database.

16 Claims, 10 Drawing Sheets

FIGURE 3E

SYSTEMS AND METHODS FOR MANAGING DATA IN A DATABASE

CROSS REFERENCE TO RELATED APPLICATION

This application is the U.S. national phase of International Application No. PCT/IB2002/004273 filed on Oct. 17, 2002 and published in English on Apr. 24, 2003 as International Publication No. WO 2003/034173 A2, the contents of which are incorporated by reference herein.

BACKGROUND OF THE INVENTION

Field of Invention

This invention relates to data management.

It relates particularly to a database of information, to a computer program product for managing the content of a database, to an information management product and to a method of compiling a database.

SUMMARY OF INVENTION

According to a first aspect of the invention there is provided a database of information relating to a particular topic, the database including a number of portions which each contain information on a particular aspect of the topic, each portion being sub-divided into a number of sub-portions which are each linked to one another in a predetermined sequential arrangement wherein each subsequent sub-portion in the sequential arrangement contains further information on the topic.

The portions of the database may be arranged into sets which are arranged in a predetermined sequential arrangement.

Selected sub-portions of the database, may include primary key expressions which are embedded in the information contained in said sub-portions, each primary key expression being linked to another sub-portion of the database which contains further information relating to the subject matter of the primary key expression.

The database may include explanatory notes, with selected sub-portions of the database, including secondary key expressions which are embedded in the information contained in said selected sub-portions and which are each linked to a particular explanatory note. Each explanatory note may include general information relating to the relevant secondary key expression. Each explanatory note may include information such as an amplification of the information; why a statement is made; and may further include a counterpoint to an argument advanced in a particular portion or sub-portion including the secondary key expression.

Selected explanatory notes may include secondary key expressions which are linked to other explanatory notes of the database.

Selected explanatory notes may include primary key expressions which are each linked to a particular sub-portion of the database.

Each sub-portion of each set includes a link to the first sub-portion of at least one portion of a succeeding set.

The database may include default explanatory notes which each contain information in the form of an overview of the information contained in a particular sub-portion of the database. In use, when the particular sub-portion of the database is selected by a user, the default explanatory note is displayed simultaneously with the relevant sub-portion.

According to a second aspect of the invention there is provided a computer program product for managing the content of a database of information relating to a particular topic, wherein the database includes a number of portions which each contain information on a particular aspect of the topic and which are each sub-divided into a number of sub-portions, the computer program product including program instructions for linking the sub-portions of each portion of the database, to one another in a predetermined sequential arrangement wherein each subsequent sub-portion in the sequential arrangement contains further information on the topic.

Selected sub-portions of the database include primary key expressions which are embedded in the information contained in said selected sub-portions, with the computer program product including program instructions for linking each primary key expression to another sub-portion of the database which contains further information relating to the subject matter of the primary key expression.

The database includes explanatory notes and wherein selected sub-portions include secondary key expressions which are embedded in the information contained in said selected sub-portions, with the computer program product including program instructions for linking each secondary key expression to a particular explanatory note.

The explanatory notes of the database have primary key expressions embedded therein, with the computer program product including program instructions for linking each primary key expression to a predetermined sub-portion of the database.

The explanatory notes of the database have secondary key expressions embedded therein, with the computer program product including program instructions for linking each secondary key expression to another explanatory note.

The database includes default explanatory notes which each contain information in the form of an overview of the information contained in a particular sub-portion of the database, with the computer program product including program instructions for displaying the default explanatory note simultaneously with the relevant sub-portion on a display device.

Portions of the database are arranged in sets which are sequentially arranged, with the computer program product including instructions for linking the sub-portions of each portion of one set, to the first sub-portion of at least one portion of a succeeding set. As such, selected portions of the database may include tertiary key expressions which can be selected by a user for providing the aforesaid links between each sub-portion of each portion of one set and the first sub-portion of one of the portions of the succeeding set.

The computer program product may be operable to link the portions and sub-portions of the database by means of hypertext links.

The computer program product may include program instructions for recording the address in the database of each sub-portion of the database from which a link using a primary key expression and/or tertiary key expression is achieved.

The computer program may include program instructions for displaying on a display device, title information representing each sub-portion from which a link is obtained via said primary key expressions or tertiary key expressions, so as to provide a user with a record of a conversation path formed by sub-portions of the database which are linked via said primary and tertiary key expressions.

The computer program product may include program instructions for recording and displaying title information in each sub-portion which is accessed from another sub-portion via a link using a primary or tertiary key expression, of said other sub-portions. The computer program product may include program instructions for enabling a user to select a particular sub-portion of the database represented by said title information, in a single operation. The Applicant envisages in this regard that the sub-portion may be selected by "clicking" on the relevant title information for the sub-portion, with a computer mouse or other input device, thereby returning the user to the selected sub-portion. It will be appreciated that the sub-portions represented by the title information can be selected in any order.

The computer program product may be executable on a processor which may be linked to any network, including but not limited to a Local Area Network (LAN), Wide Area Network (WAN), intranet, telecommunications network or the Internet and may include a communications component for preparing and sending messages to display devices of processors, cellular telephones etc., in said WAN, LAN, intranet, telecommunications network or the Internet. In a particular embodiment, the computer program product may include program instructions for recording parts of said sub-portions or explanatory notes selected by a user, in a message format such as an e-mail message format and for permitting a user to generate a feedback message commenting on the selected part, which can be sent as an e-mail message to a predetermined site in said WAN, LAN, intranet or the Internet.

The computer program product may include a monitoring component which includes program instructions for recording users' selections of primary, secondary and tertiary key expressions. In use, this enables the usage of the database to be monitored.

According to a third aspect of the invention there is provided an information management product which comprises:

a database component containing information relating to a particular topic, the database component including a number of portions which each contain information on a particular aspect of the topic and which are each sub-divided into a number of sub-portions; and a computer program component for managing the content of the database, the computer program component including program instructions for linking the sub-portions of each portion of the database to one another in a predetermined sequential arrangement wherein each subsequent sub-portion in the sequential arrangement contains further information on the topic.

The database component may be substantially equivalent to the database as defined and described in accordance with the first aspect of the invention.

The computer program component may be equivalent to the computer program product as described and defined hereinabove in accordance with the second aspect of the invention.

According to a fourth aspect of the invention there is provided a method of compiling a database of information relating to a particular topic, which includes the steps of:

compiling a number of portions of the database, wherein each portion contains information on a particular aspect of the topic and wherein each portion is sub-divided into a number of sub-portions;

defining primary key expressions in the information contained in selected sub-portions of the database; and creating user-executable links between each primary key expression and another sub-portion of the database which contains further information relating to the subject matter of the primary key expressions.

According to a fifth aspect of the invention there is provided a method of compiling a database of information relating to a particular topic, which includes the steps of:

compiling a number of portions of the database, wherein each portion contains information on a particular aspect of the topic and wherein each portion is sub-divided into a number of sub-portions; and linking each of the sub-portions of each portion of the database to one another in a predetermined sequential arrangement wherein each subsequent sub-portion in the sequential arrangement contains further information on the topic.

BRIEF DESCRIPTION OF THE DRAWINGS

Further features of the invention are described hereinafter by way of a non-limiting example of the invention, with reference to and as illustrated in the accompanying diagrammatic drawings. In the drawings:

FIGS. 3A to 3H show, in sequence, an example of a conversation path through a database in accordance with the invention.

DETAILED DESCRIPTION

Figure 1:
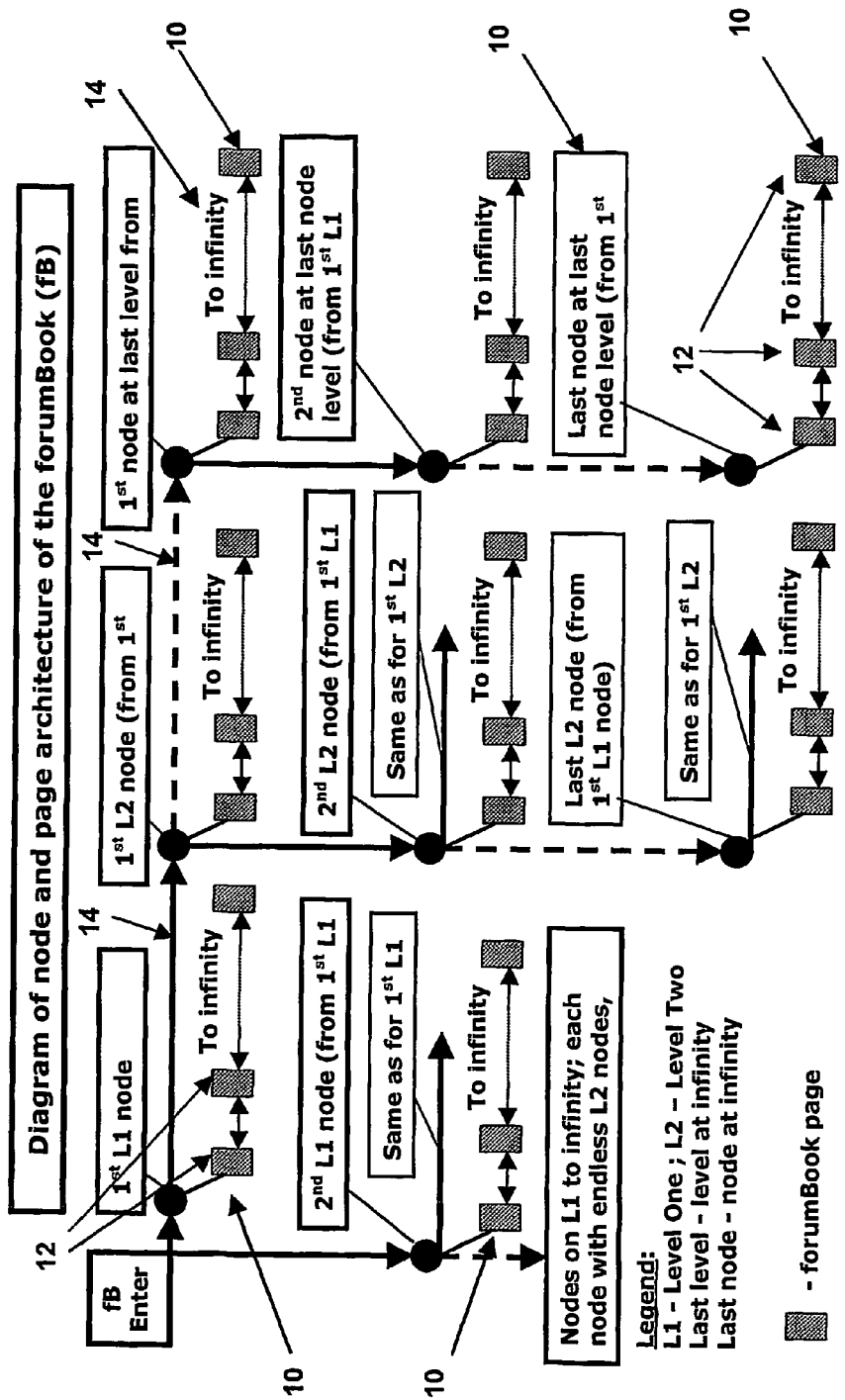
FIG. 1 shows a schematic layout representing the structure of a database in accordance with the invention.

With reference to FIG. 1 of drawings, a database in accordance with the invention, which is referred to as the "forumBook" contains information relating to a particular topic and includes a number of portions 10 which are each sub-divided into a number of sub-portions 12 (also referred to herein as "pages"). The portions are further arranged into a number of sets 14 (or levels "L").

The sub-portions 12 of each portion 10, are also linked to one another in a sequential arrangement wherein each subsequent sub-portion in the sequential arrangement contains further information on the topic. The sub-portions of each portion are thus arranged in a linear progression with provides a user navigating the sub-portions with increasing information on the topic as the user progresses along a linear "path" through the sub-portions.

It will be appreciated that the information on a particular topic is thus segmented into smaller "packages" which, in the case of the sub-portions 12, are arranged sequentially. The number of sets, portions and sub-portions forming the forumBook will be determined by the compiler of the database. The number of sets, portions and sub-portions used in each case will thus depend on the nature, scope and amount of subject matter to be covered in the database.

The portions 10 of the database are linked to one another via "nodes" as is illustrated in FIG. 1.

As indicated above, the sets, the portions and the sub-portions of the database are compiled by or in collaboration with the compiler of the database. The arrangement of the sets, the portions and the sub-portions of the database thus allows a linear and seamless progression of understanding of the topic similar to the progression when people have a conversation about the topic. The links between the sub-portions of the database can thus be likened to "conversation paths". The manner in which the database can be navigated will be explained in more detail hereinafter.

Figure 2:
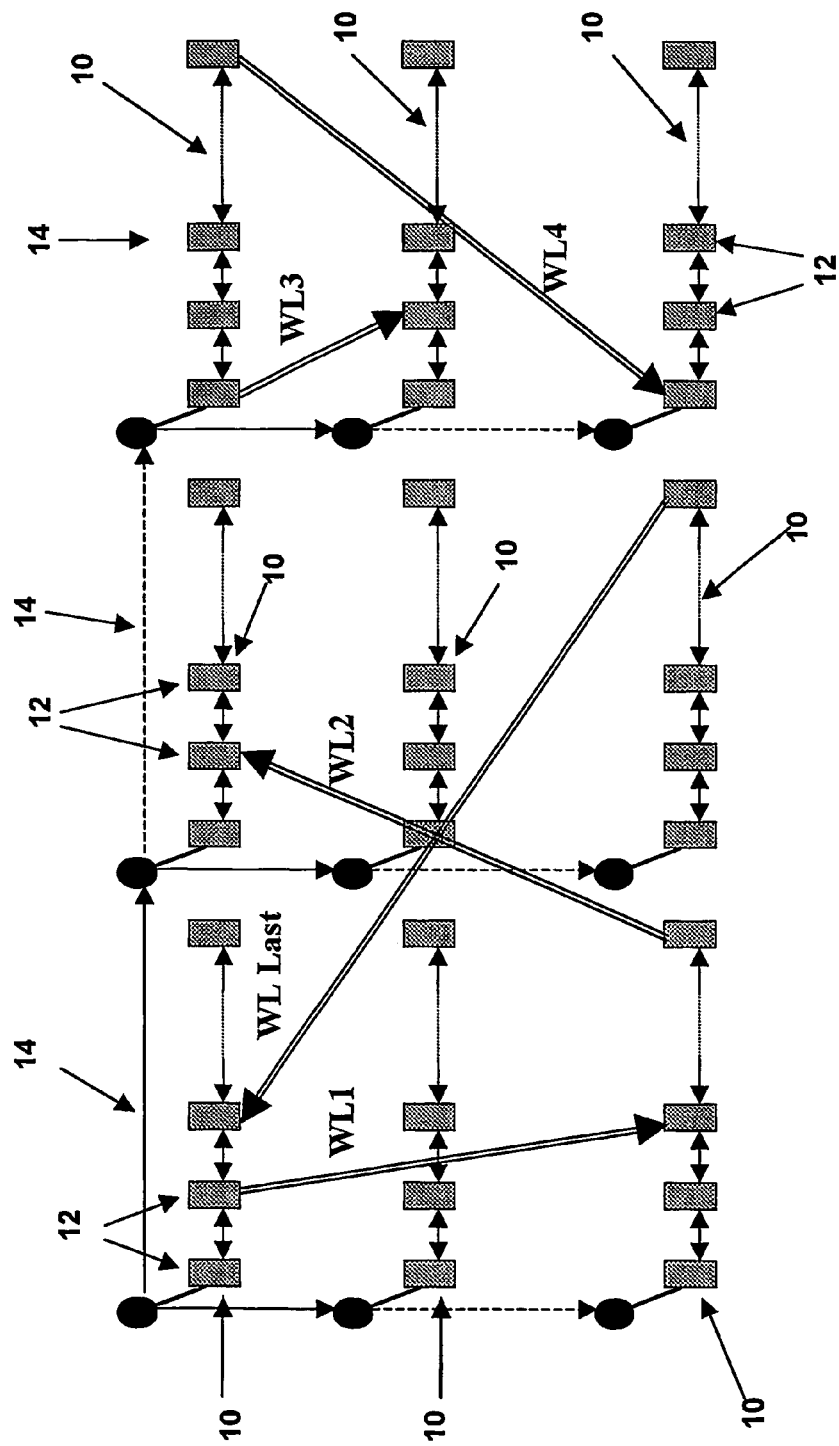
FIG. 2 shows a schematic layout of the database of FIG. 1, illustrating the manner in which sub-portions of the database are linked by primary key expressions.

Selected sub-portions 12 of each portion of the database include primary key expressions which are embedded in the information contained in said sub-portions. The primary key expression in one sub-portion of the database is linked to another sub-portion of the database which contains further information relating to the subject matter of the primary key expression. The sub-portion to which the primary key expression is linked, may be in the same portion or possibly in a different portion of the database. The sub-portion to which a primary key expression is linked may even form part of a portion in a different set of the database. With reference to FIG. 2 of the drawings, the manner in which primary key expressions embedded in particular sub-portions 12 of the database are linked to other sub-portions 12 of the database, are illustrated by link indicator lines "WL1", "WL2", "WL3", "WL4" and "WL Last". Hence, the primary key expressions provide a user with a link to other sub-portions in the database which may form part of the same portion, another portion in the same set or any other portion in any other set of the database.

The database includes explanatory notes and selected sub-portions 12 of the database include secondary key expressions which are embedded in the information contained therein and which are linked to the explanatory notes.

Figure 3A:
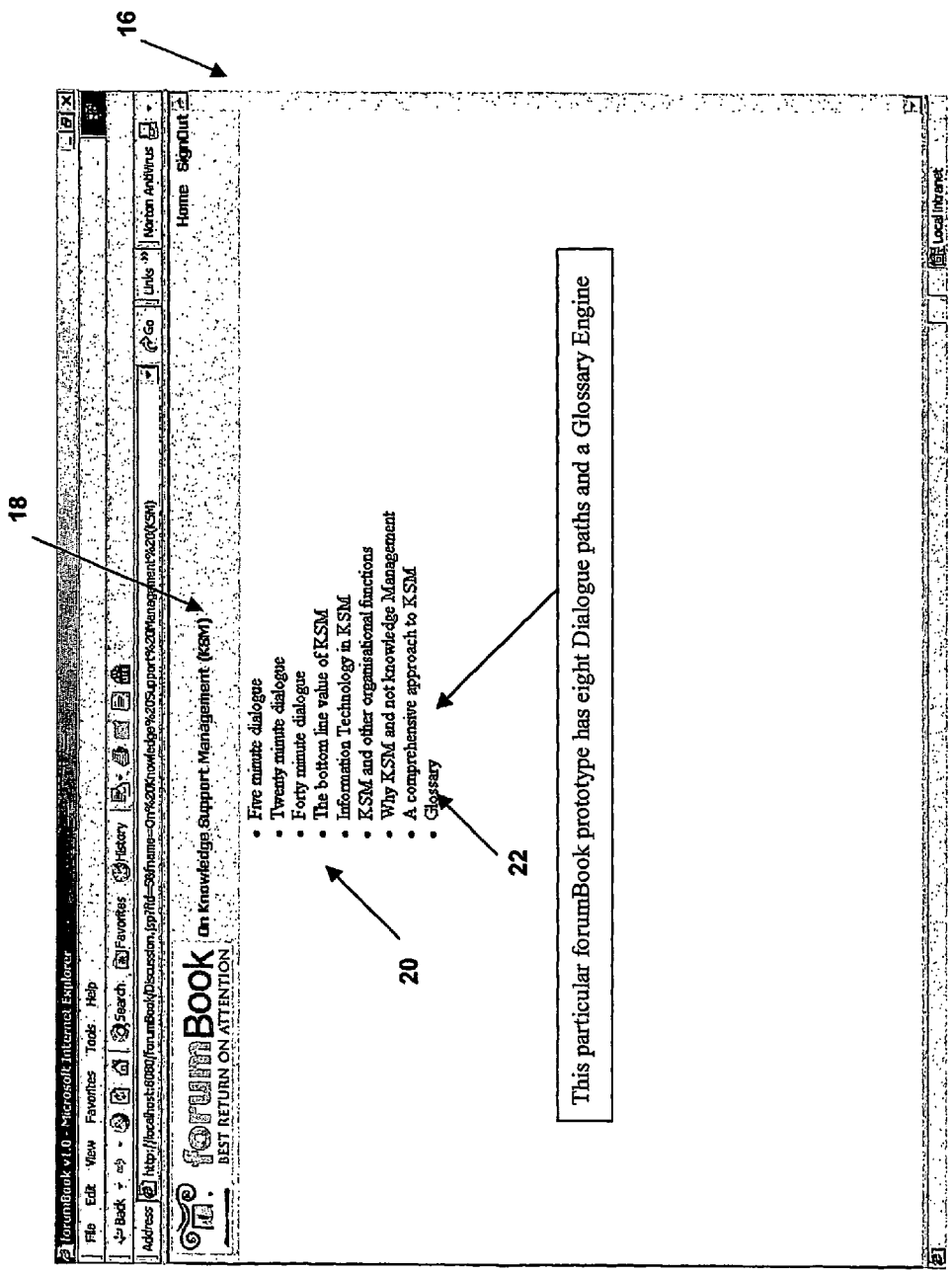

With reference to FIG. 3A of the drawings, a forumBook screen display 16 is shown. The screen display 16 includes a title 18 of the forumBook and a menu 20 containing the titles of eight portions or "dialogue paths" of one set of portions of the database and a glossary engine 22 that can be selected by a user. The database is executable using a Microsoft Internet Explorer operating system.

Figure 3B:
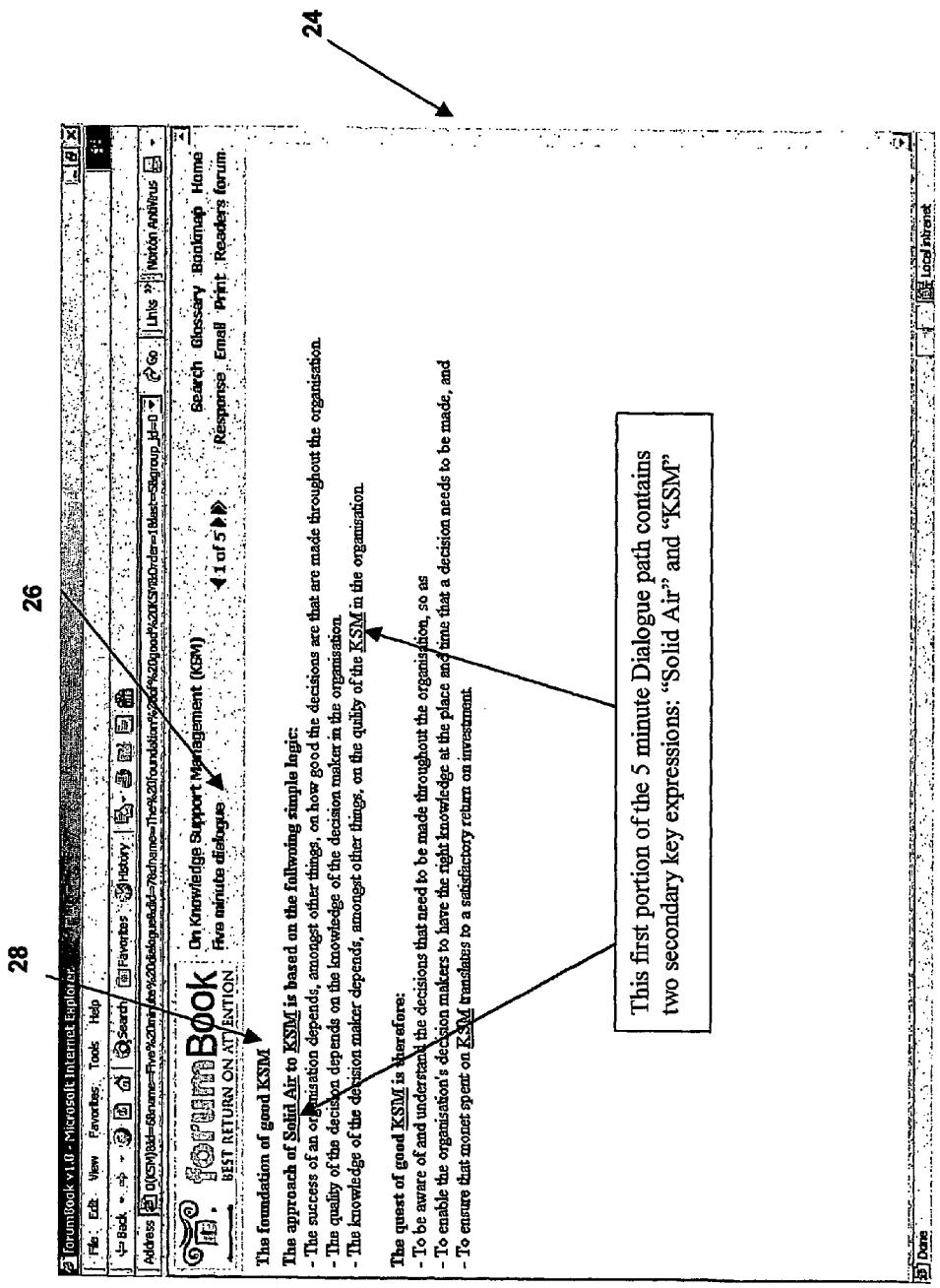

In order to enter the first sub-portion of the first portion which is entitled "Five minute dialogue" the portion is selected from the menu 20 by clicking on the title of the portion. The first sub-portion or page entitled "The foundation of good KSM" 28 is then opened on screen display 24 (see FIG. 3B). The title of the portion, viz. "Five minute dialogue" 26 is displayed at the top of the screen together with a number of buttons, viz. "▶", "◀" which will take a user to the next and previous sub-portions, respectively. A "search" button, when selected, will cause a search for keywords in the database to be implemented. A "Bookmap" button provides a graphical representation of the database and a "Readers forum" button selects a discussion forum attached to each sub-portion. Further buttons include "Response", "email", "Print" and "Home". As indicated hereinabove, the sequential arrangement of the sub-portions of the database is determined by the compiler of the database.

Figure 3C:
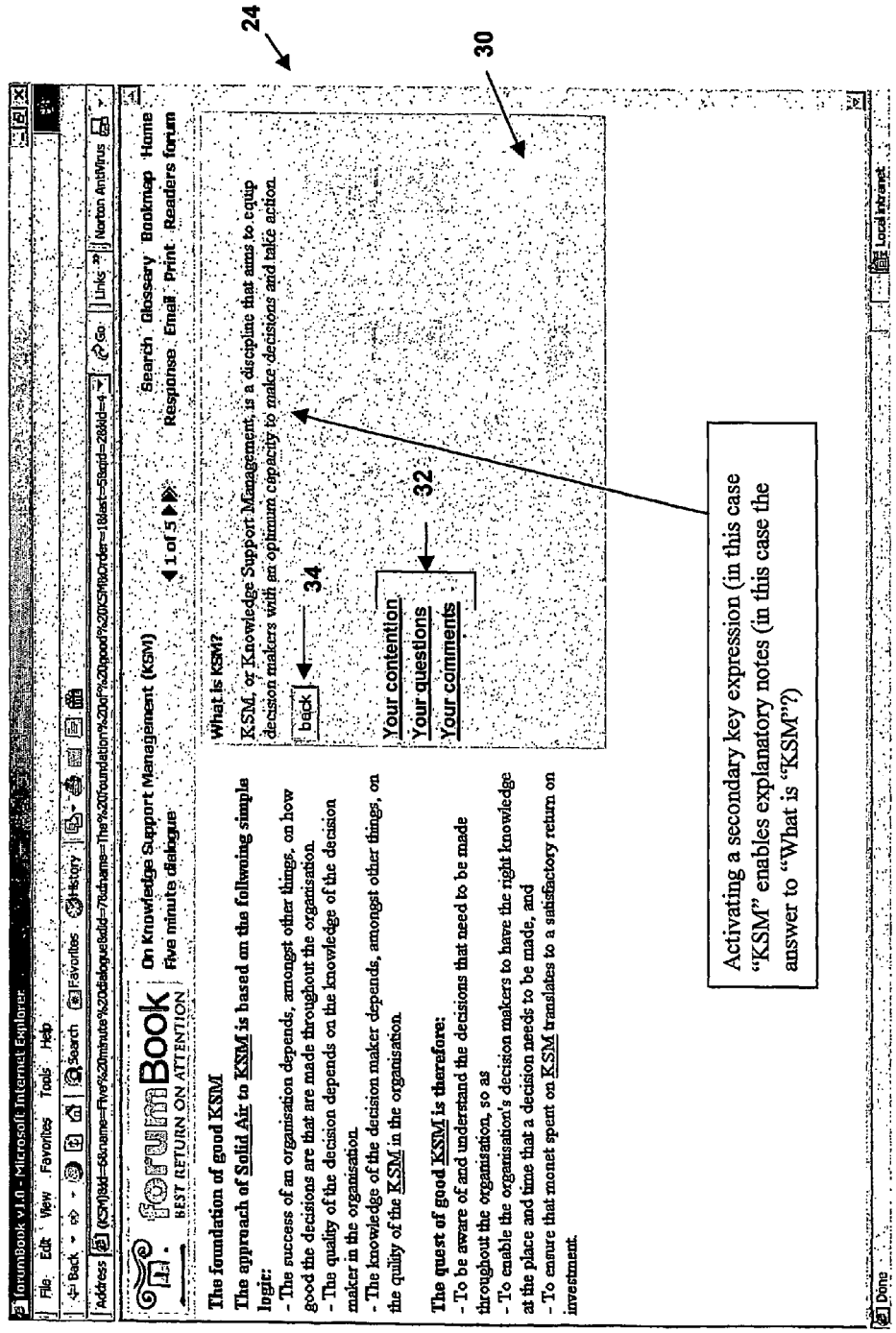

The first page of the first portion contains two secondary key expressions, viz. "Solid air" and "KSM" which are both underlined for ease of identification. Each of the secondary key expressions are linked to an explanatory note which includes information relating to the particular secondary key expressions selected. For example, the secondary key expression "KSM" can be selected and activated by double clicking on KSM on the screen display. This causes a second window 30 to be opened on the screen (see FIG. 3C), containing an explanatory note including further information relating to the secondary key expression. Each explanatory note may include an amplication of the information such as who or what the information contained in the relevant secondary key expression is, why a statement is made, and further may include a counterpoint to an argument advanced in a particular sub-portion including the relevant secondary key expression. The Applicant also envisages that explanatory notes may also include primary key expressions which are linked to predetermined sub-portions of the database. Further, the Applicant envisages that explanatory notes may include secondary key expressions which are linked to other explanatory notes of the database. In addition, the Applicant envisages that the structure of the explanatory notes containing secondary key expressions referring to other explanatory notes, may carry on indefinitely.

The window 30 includes prompts 32 which can be selected by a user to allow the user to provide a "contention", raise "questions" and provide "comment". Upon selecting one of the user prompts a window is opened allowing a user to compile an e-mail message containing a "contention", "questions" and/or "comments", which can then be sent to a recipient for processing.

In order to close the window 30, the "back" prompt 34 can be selected by the user. Alternatively, another secondary key expression can be selected to close the window 30 and open another window.

Figure 3D:
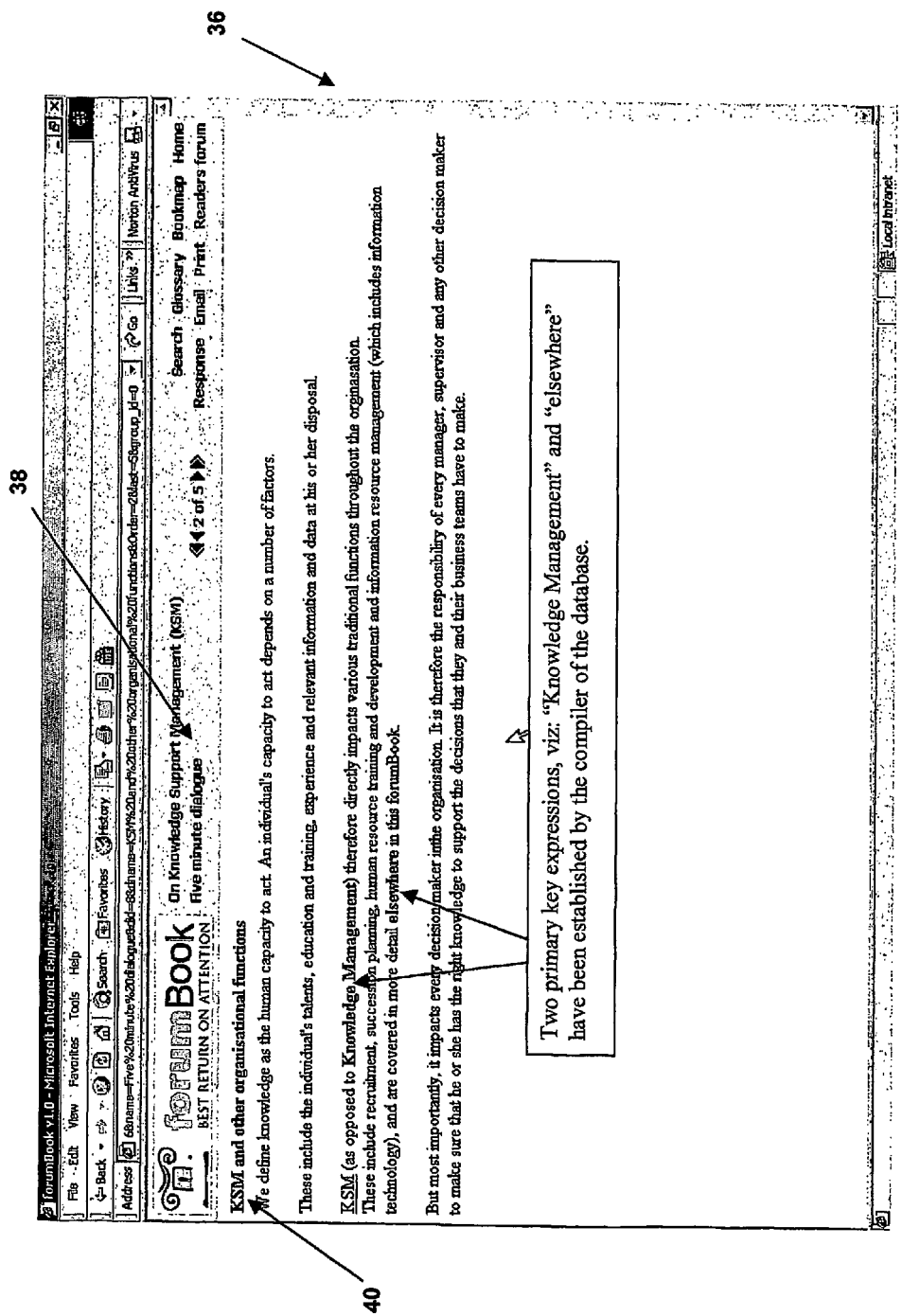

By clicking the "▶" button, the next page (sub-portion) of the first portion of the database is displayed on screen display 36 (see FIG. 3D). Further, a "◀" button is displayed on screen display 36, which when activated allows a user to return to the previous page of the first portion.

The screen display 36 is entitled "Five minute dialogue" 38, which is the title of the first portion. Further, the screen display 36 displays the sub-title "KSM and other organisational functions" 40 of the second page of the first portion.

The page includes two primary key expressions, viz. "Knowledge Management" and "elsewhere" which have been established by the compiler of the database and which are linked to another sub-portion of the database which contains further information relating to the subject matter of the relevant primary key expression. The primary key expressions can be activated by clicking on the relevant primary key expression.

Figure 3E:
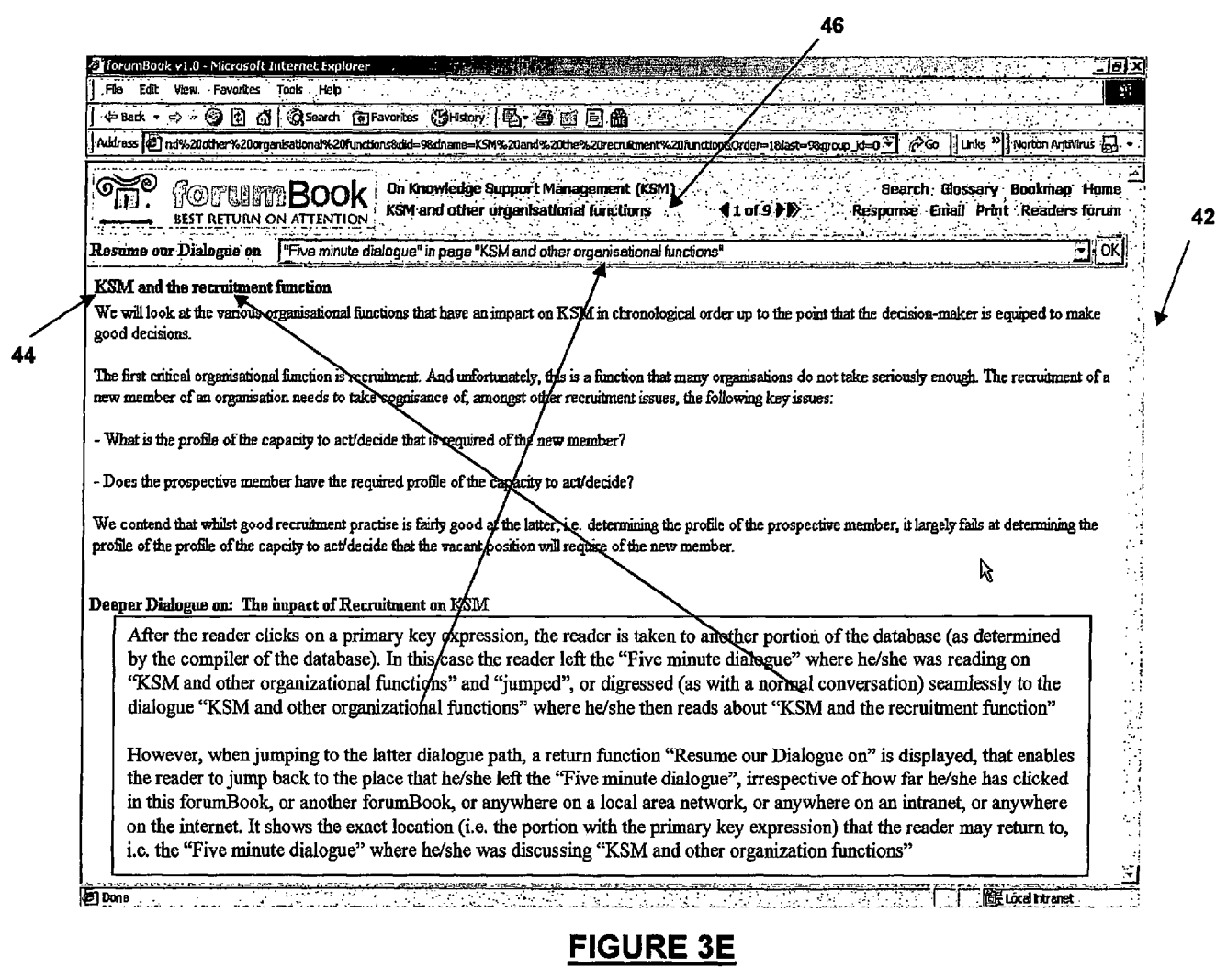

By clicking on the primary key expression "elsewhere" contained in the text displayed on screen display 36, screen display 42 (see FIG. 3E) is activated. The primary key expression selected on screen display 36 is linked to a sub-portion entitled "KSM and the recruitment function" 44 and forming part of the eighth portion of the first set of the database which is entitled "KSM and other organisational functions" 46. It will be appreciated that the user has now left the first portion of the first set, entitled "five minute dialogue" and has jumped to the eighth portion entitled "KSM and other organisational functions" of the first set.

The invention extends to a computer program product for managing the content of the forumBook, which includes program instructions for linking the sub-portions of each portion of the database to one another in a predetermined sequential arrangement as determined by the compiler of the database. The computer program product also includes program instructions for linking each primary key expression in one sub-portion of the database to another sub-portion of the database as described hereinabove. The computer program product further includes program instructions for linking the secondary key expressions to the explanatory notes as described hereinabove.

Figure 3F:
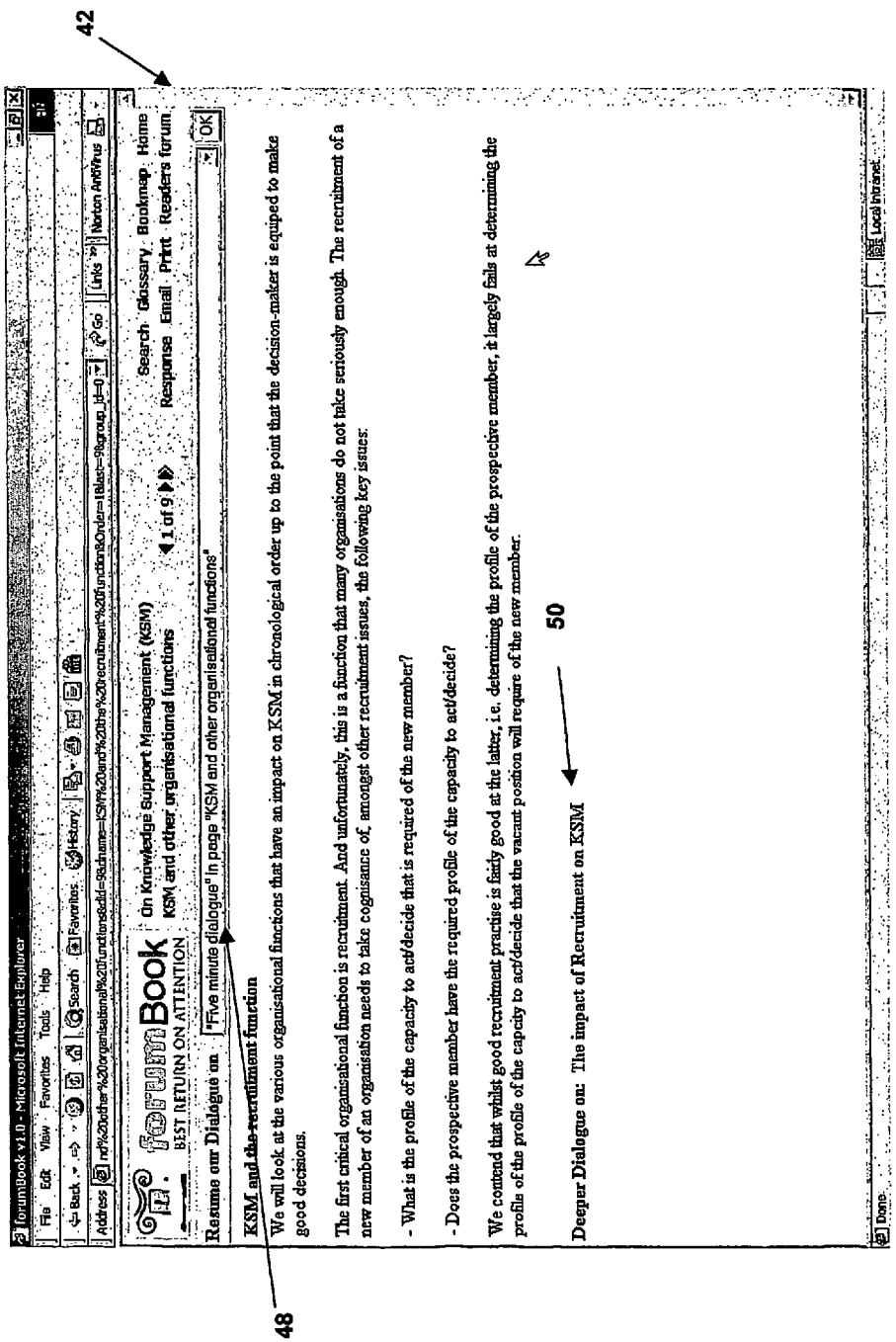

In addition, the computer program product includes program instructions for recording the portion and the relevant sub-portion from which a link is obtained to a subsequent sub-portion via a link from a primary key expression. With reference to FIG. 3F of the drawings, it can be seen that the title of the portion "five minute dialogue" and of the relevant sub-portion "KSM and other organisational functions", is displayed in a dialogue box 48 near the top of the screen display. The dialogue box 48 thus contains an address of the portion and relevant sub-portion from which a link using a primary key expression, is obtained. In order to return to the relevant sub-portion, a user can merely select the address of the previous sub-portion by clicking on the "address" in the dialogue box 48. The computer program product thus includes program instructions for recording the address of each sub-portion of the database from which a link using a primary key expression is made, and for displaying title information representing the portion and relevant sub-portion.

The screen display 42 includes a tertiary key expression 50 two-thirds down the screen, which can be selected by a user to navigate to the first sub-portion of the portion entitled "The impact of recruitment on KSM", forming part of the second set of the database. As such, clicking on the tertiary key expression 50, viz. "The impact of Recruitment on KSM", causes screen display 51 to be activated. It must be appreciated that although in this example, the second set contains only one portion, all of the titles of the portions of the succeeding sets will be displayed as tertiary key expressions on each sub-portion of the database. Hence, a user will be able to select one of the tertiary key expressions to navigate to the first sub-portion of the portion represented by the selected tertiary key expressions.

Figure 3G:
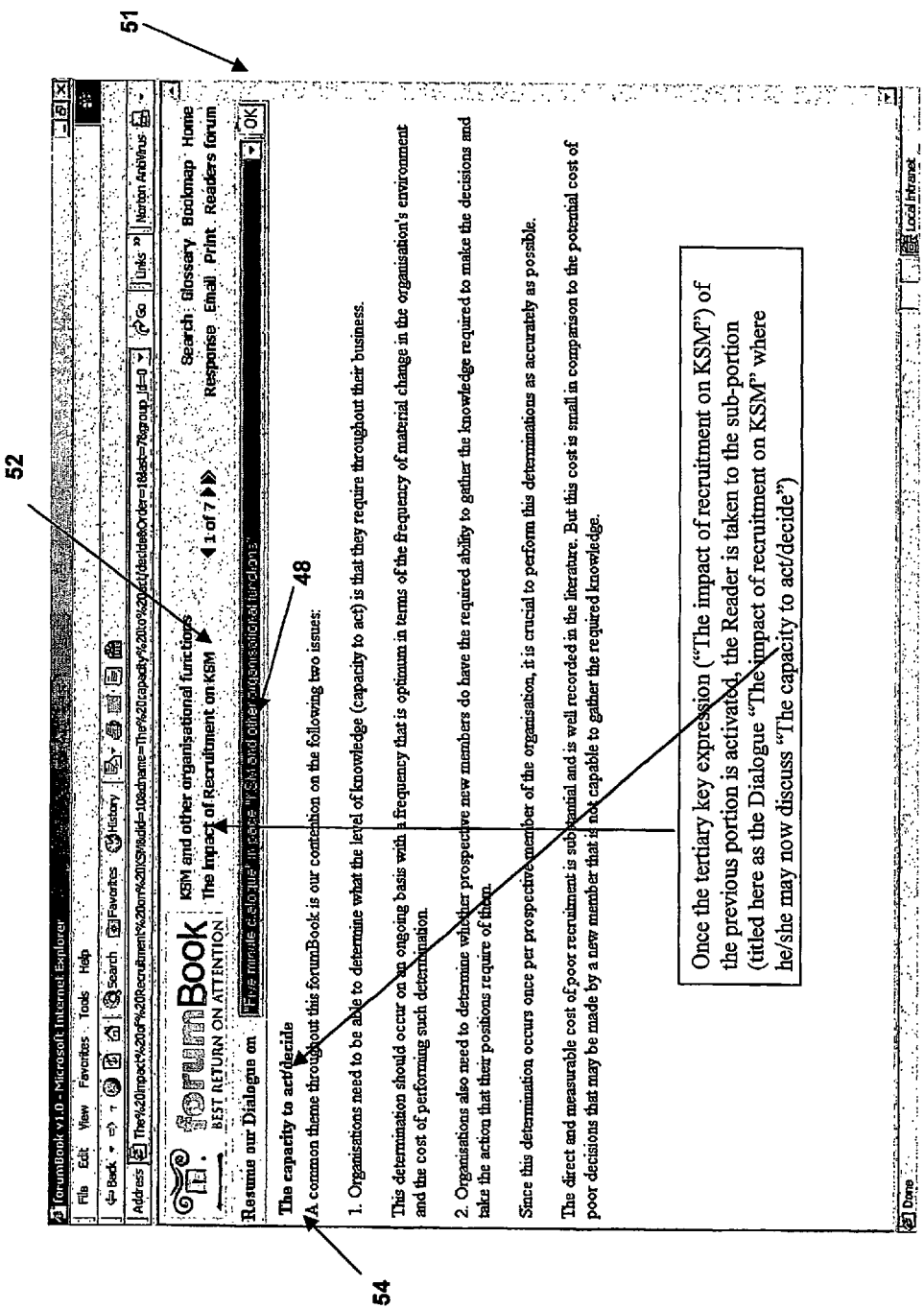
Figure 3H:
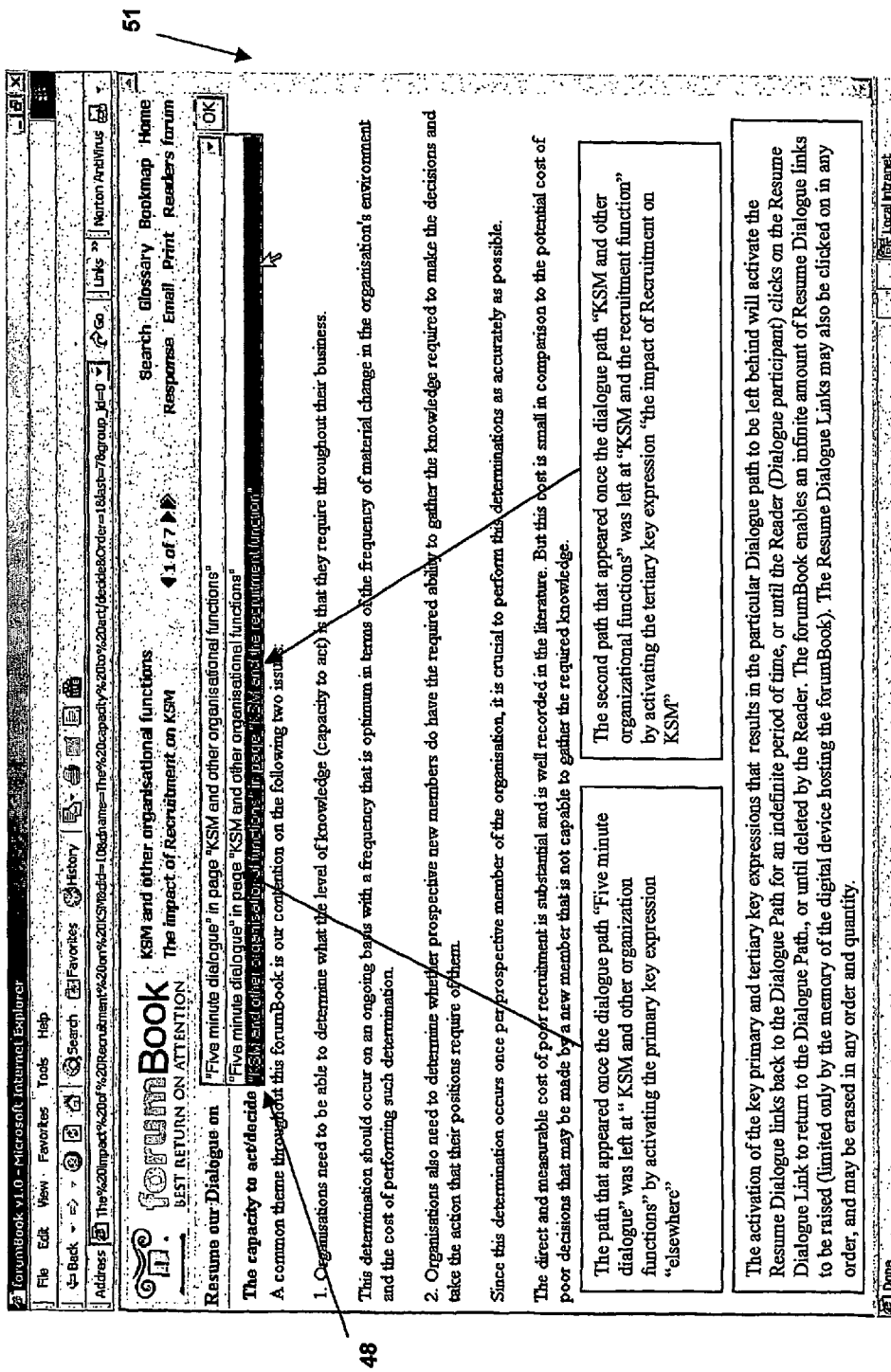

With reference to FIG. 3G, screen display 51 displays the title of the relevant portion, viz. "The impact of Recruitment on KSM 52" and the title 54 of the sub-portion selected, viz. "The capacity to act/decide". The tertiary key expression 50 is, in effect, a default link which provides a link from a sub-portion in one set of the database to a sub-portion located in a succeeding set of the database. With reference to FIG. 3H of the drawings, it can be seen that the dialogue box 48 contains the titles of the portion and the relevant sub-portion from which a link was made via the tertiary key-expression 50. By using a single operation, in this instance by clicking on the relevant part of the dialogue box, the user can return to the sub-portion from which the link was made. Hence, the dialogue box provides a "dialogue path" which is recorded thus allowing a user to return to any sub-portion in the database from which a link was made via a primary key expression or a tertiary key expression.

The computer program product includes a feedback component which includes program instructions which permits any part of the information contained in a sub-portion or an explanatory note of the database, to be selected by a user and the user's selection to be recorded.

The computer program product is executable on a processor that may be linked to another processor via a WAN, LAN, intranet or the Internet. The computer program product may include an electronic mail component for preparing and sending e-mail messages to another processor in said WAN, LAN, intranet or the Internet. In order to provide feedback on the content of the database, the computer program product includes program instructions which permit a user to select parts of sub-portions or explanatory notes of the database which are then recorded in an e-mail message which allows the user to comment on the selected part. The e-mail message can be sent to a predetermined recipient in said WAN, LAN, intranet or the Internet so as to provide feedback on the selected text. It will be appreciated that in another embodiment, the computer program product may be executed on a processor that is linked, via a telecommunications network, to a cellular telephone for sending so-called SMS text messages to the cellular telephone.

The computer program product includes a monitoring component which includes program instructions for recording users' selections of primary and secondary key expressions. The monitoring component includes program instructions for reporting the recorded users' selections via e-mail or the like, to a recipient. This provides feedback on the use of the primary and secondary key expressions thereby providing an indication of those sub-portions/portions of the database which users find most interesting or possibly even least interesting. The Applicant envisages that in a wide application, monitoring components may be operable to monitor the use of any part of the forumBook by any participant, i.e. by a user or a compiler of the database. The content of the database can thus be adjusted accordingly by possibly amplifying certain information in certain portions/sub-portions or removing information from other.

The Applicant envisages that two or more forumBooks covering different topics may be linked. More particularly, the Applicant envisages that particular sub-portions of one forumBook may be linked via a primary key expression, to sub-portions in another forumBook. Further, the Applicant envisages that primary key expressions may provide links to other databases (not being forumBooks) or pages of information.

The invention extends to an information management product which includes as components thereof, the database and the computer program product described hereinabove.

The invention claimed is:

1. A non-transitory computer-storage medium having computer program instructions stored thereon, the computer program instructions causing a computer processor to execute a method to enable management of information relating to a particular topic, comprising:

compiling a database in which the information is stored, the database comprising a first portion subdivided into first sub-portions and a second portion subdivided into second sub-portions, wherein the information is stored in both the first sub-portions and second sub-portions;

linking the first sub-portions in a first predetermined sequential arrangement such that, when at least a part of the information is stored in the first sub-portions, each subsequent sub-portion in the first predetermined sequential arrangement contains further information on the particular topic compared to a previous sub-portion;

linking the second sub-portions in a second predetermined sequential arrangement such that navigation from one second sub-portion to another succeeding or preceding second sub-portion within the second predetermined sequential arrangement is permitted, when at least another part of the information is stored in the second sub-portions;

defining primary key expressions, in particular information parts that are stored in selected sub-portions of at least one of the first sub-portions and the second sub-portions, wherein the primary key expressions are defined based on content of the particular information parts selected by the compiler;

establishing explanatory notes in which additional information parts are provided by the compiler;

defining secondary key expressions in particular different information parts that are stored in selected sub-portions of at least one of the first sub-portions and the second sub-portions and linking each secondary key expression to a different explanatory note;

linking each secondary key expression to a particular associated explanatory note in an arrangement wherein receiving a selection of a particular secondary key expression from the user, causes the particular associated explanatory note to be displayed;

responsive to receiving a user selection of at least one of the primary key expressions, stored in at least one of the selected sub-portions of the first sub-portions, and using the at least one of the primary key expressions, establishing a user-executable navigation link permitting a user to navigate from the at least one selected sub-portion of the first sub-portions to a second sub-portion of the second sub-portions, wherein the second sub-portion is non-sequential to the at least one selected sub-portion; and recording an address in the database of the at least one selected sub-portion of the first sub-portions from which the user-executable navigation link is made to allow the user to return to the at least one selected sub-portion of the first sub-portions from which the navigation link is made.

2. The computer-storage medium as claimed in claim 1, further comprising displaying a view of the at least one selected sub-portion from which the navigation link is made, to be displayed in a same format as it was displayed before the navigation link to the second sub-portion was made.

3. A The computer-storage medium as claimed in claim 1, further comprising recording and displaying title information representing each sub-portion from which the navigation link is made.

4. The computer-storage medium as claimed in claim 1, further comprising establishing default explanatory notes in which the additional information parts are provided by the compiler, the program instructions being operable to display the default explanatory notes simultaneously with an information part in a particular sub-portion of the database.

5. The computer-storage medium as claimed in claim 1, further comprising a feedback component including program instructions permitting any of the information parts contained in a sub-portion or explanatory note of the database, to be selected by the user and for the user's selection to be recorded.

6. The computer-storage medium as claimed in claim 1, further comprising a monitoring component including program instructions for recording a user's selection of the primary and the secondary key expressions.

7. The computer-storage medium as claimed in claim 1, further comprising displaying title information representing each sub-portion from which a navigation link is made so as to provide the user with a record of those sub-portions of the database from which navigation links are made.

8. The computer-storage medium as in claim 1, further comprising:
 displaying on a display device, title information representing each sub-portion from which a link is made via the primary key expressions, so as to provide the user with a record of a conversation path formed by sub-portions of the database which are linked via the primary key expressions.

9. The computer-storage medium as in claim 8, further comprising:
 recording and displaying the title information in an order representing the access sequence of any sub-portions which were accessed by a user.

10. An information management product which comprises:
 a non-transitory computer-storage medium for storing a database component and a computer program component;
 the database component configured to store information relating to a particular topic, wherein the database component is stored on the non-transitory computer-storage medium and comprising a first portion subdivided into first sub-portions and a second portion sub-divided into second sub-portions, wherein information on a plurality of aspects of the particular topic is stored in the first sub-portions and the second sub-portions; and
 the computer program component configured to manage the information relating to the particular topic stored by the database component, wherein the computer program component is stored on the non-transitory computer-storage medium and executable by a computer processor and including program instructions for:
 linking the first sub-portions in a first predetermined sequential arrangement such that, when at least a part of the information is stored in the first sub-portions, each subsequent sub-portion in the first predetermined sequential arrangement contains further information parts on the particular topic compared to a previous sub-portion; and
 linking the second sub-portions in a second predetermined sequential arrangement such that navigation from one second sub-portion to another succeeding or preceding second sub-portion within the second predetermined sequential arrangement is permitted, when at least another part of the information is stored in the second sub-portions;
 defining primary key expressions, in particular information parts that are stored in selected sub-portions of at least one of the first sub-portions and the second sub-portions, wherein the primary key expressions are defined based on content of the particular information parts selected by the compiler;
 establishing explanatory notes in which additional information parts are provided by the compiler;
 defining secondary key expressions in particular different information parts that are stored in selected sub-portions of at least one of the first sub-portions and the second sub-portions and linking each secondary key expression to a different explanatory note;
 linking each secondary key expression to a particular associated explanatory note in an arrangement, wherein receiving a selection of a particular secondary key expression from the user, causes the particular associated explanatory note to be displayed;
 responsive to receiving a user selection of at least one of the primary key expressions stored in at least one of the selected sub-portions of the first sub-portions, and using the at least one of the primary key expressions, establishing a user-executable navigation link permitting a user to navigate from the at least one selected sub-portion of the first sub-portions to a second sub-portion of the second sub-portions, wherein the second sub-portion is non-sequential to the at least one selected sub-portion; and
 record an address in the database component of the at least one selected sub-portion of the first sub-portions from which a navigation link is made to allow the user to return to the at least one selected sub-portion of the first sub-portions from which the navigation is made.

11. The information management product as in claim 10, wherein the computer program component is further configured to display on a display device, title information representing each sub-portion from which a link is made via the primary key expressions, so as to provide the user with a record of a conversation path formed by sub-portions of the database which are linked via the primary key expressions.

12. The information management product as in claim 11, wherein the computer program component is further configured to record and display the title information in an order representing an access sequence of any sub-portions which were accessed by the user.

13. A method of compiling a database of information relating to a particular topic, which comprises:

compiling a first portion and a second portion of the database, wherein the first portion is subdivided into first sub-portions and the second portion is subdivided into second sub-portions;

linking the first sub-portions in a first predetermined sequential arrangement such that navigation from one first sub-portion to another succeeding or preceding first sub-portion within the predetermined sequential arrangement is permitted, when at least a part of the information is stored in the first sub-portions;

linking the second sub-portions in a second predetermined sequential arrangement such that navigation from one second sub-portion to another succeeding or preceding second sub-portion within the second predetermined sequential arrangement is permitted, when at least another part of the information is stored in the second sub-portions;

storing the at least part of the information by inserting the at least part of the information in the first sub-portions in the first sequential arrangement wherein each subsequent sub-portion contains further information part on the particular topic than in an immediately preceding sub-portion to which the succeeding first sub-portion is linked;

defining primary key expressions, in particular information parts that are stored in selected sub-portions of at least one of the first sub-portions and the second sub-portions, wherein the primary key expressions are defined based on content of the particular information part selected by the compiler;

establishing explanatory notes in which additional information parts are provided by the compiler;

defining secondary key expressions in particular different information parts that are stored in selected sub-portions of at least one of the first sub-portions and the second sub-portions and linking each secondary key expression to a different explanatory note;

linking each secondary key expression to a particular associated explanatory note in an arrangement, wherein receiving a selection of a particular secondary key expression from the user, causes the particular associated explanatory note to be displayed;

responsive to receiving a user selection of at least one of the primary key expressions stored in at least one of the selected sub-portions of the first sub-portions, and using the at least one of the primary key expressions, establishing a user-executable navigation link to permit a user to navigate from the at least one selected sub-portion of the first sub-portions of the database to a second sub-portion of the second sub-portions, wherein the second sub-portion is non-sequential to the at least one selected sub-portion; and recording an address in the database of the at least one selected sub-portion of the first sub-portions from which the user-executable navigation link is made to allow the user to return to the at least one selected sub-portion of the first sub-portions from which the navigation link is made.

14. The method of claim 13, further comprising:

displaying a view of the at least one selected sub-portion from which the navigation link is made, in a same format as it was displayed before the navigation link to the second sub-portion was made.

15. The method of claim 13, further comprising:

displaying on a display device, title information representing each sub-portion from which a link is made via the primary key expressions, so as to provide the user with a record of a conversation path formed by sub-portions of the database which are linked via the primary key expressions.

16. The method claim 15, further comprising:

recording and displaying the title information in an order representing an access sequence of any sub-portions which were accessed by a user.

* * * * *